US008255649B2

(12) United States Patent
Hiraiwa et al.

(10) Patent No.: US 8,255,649 B2

(45) Date of Patent: Aug. 28, 2012

(54) REMOTE COPY CONTROL METHOD AND SYSTEM IN STORAGE CLUSTER ENVIRONMENT

(75) Inventors: Yuri Hiraiwa, Sagamihara (JP); Yoshiyuki Nishi, Fujisawa (JP); Kenichi Oyamada, Yokohama (JP); Yoshinori Matsui, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 285 days.

(21) Appl. No.: 12/687,694

(22) Filed: Jan. 14, 2010

(65) Prior Publication Data

US 2011/0078396 A1 Mar. 31, 2011

(30) Foreign Application Priority Data

Sep. 29, 2009 (JP) ................................ 2009-223621

(51) Int. Cl.
*G06F 12/16* (2006.01)

(52) U.S. Cl. ................................ 711/162; 711/E12.103

(58) Field of Classification Search .................. 711/162, 711/E12.103
See application file for complete search history.

(56) References Cited

U.S. PATENT DOCUMENTS

| | | | | |
|---|---|---|---|---|
| 6,263,454 | B1 * | 7/2001 | Gold et al. | 714/25 |
| 7,043,665 | B2 | 5/2006 | Kern et al. | |
| 7,167,962 | B2 | 1/2007 | Nakano et al. | |
| 7,447,855 | B2 | 11/2008 | Suishu et al. | |
| 2003/0200275 | A1 * | 10/2003 | Hirabayashi et al. | 709/214 |
| 2004/0260899 | A1 * | 12/2004 | Kern et al. | 711/162 |
| 2007/0050573 | A1 * | 3/2007 | Arakawa et al. | 711/162 |
| 2007/0220322 | A1 * | 9/2007 | Mikami | 714/13 |
| 2007/0254922 | A1 * | 11/2007 | Hiraiwa et al. | 514/338 |
| 2008/0104443 | A1 * | 5/2008 | Akutsu et al. | 714/6 |
| 2011/0196825 | A1 | 8/2011 | Suzuki | |

* cited by examiner

*Primary Examiner* — Hal Schnee
(74) *Attorney, Agent, or Firm* — Foley & Lardner LLP

(57) ABSTRACT

The present invention causes an asynchronous remote copy to work together with storage clustering technology. A host computer program for controlling the asynchronous remote copy carries out an asynchronous remote copy pair operation by asynchronously working together with a switchover instruction of a storage clustering control program that performs a host write-destination volume switchover in a storage clustering environment.

9 Claims, 9 Drawing Sheets

5100

| GROUP IDENTIFIER (5101) | FIRST ATTRIBUTE (5102) | SECOND ATTRIBUTE (5103) |
|---|---|---|
| G1 | SYNCHRONOUS COPY | APPLYING CLUSTERING FUNCTION |
| G2 | ASYNCHRONOUS COPY | — |
| G3 | ASYNCHRONOUS COPY | — |

| GROUP IDENTIFIER | G1 |
| --- | --- |
| PRIMARY DEVICE IDENTIFIER | SECONDARY DEVICE IDENTIFIER |
| A0001 | B0001 |
| A0002 | B0002 |

| GROUP IDENTIFIER | G2 |
| --- | --- |
| PRIMARY DEVICE IDENTIFIER | SECONDARY DEVICE IDENTIFIER |
| A0001 | C0001 |
| A0002 | C0002 |

| GROUP IDENTIFIER | G3 |
| --- | --- |
| PRIMARY DEVICE IDENTIFIER | SECONDARY DEVICE IDENTIFIER |
| B0001 | C0001 |
| B0002 | C0002 |

REMOTE COPY CONTROL METHOD AND SYSTEM IN STORAGE CLUSTER ENVIRONMENT

CROSS-REFERENCE TO RELATED APPLICATIONS

This application relates to and claims priority from Japanese Patent Application No. 2009-223621 filed on Sep. 29, 2009, the entire disclosure of which is incorporated herein by reference.

BACKGROUND OF THE INVENTION

The present invention relates to data protection technology in a computer system.

Needless to say, high availability is required for key public and private sector systems that support the social infrastructure. For this reason, there is the technology disclosed in U.S. Pat. No. 7,043,665 as storage clustering technology that realizes application continuity. In this technology, the identity of data in a first storage apparatus and a second storage apparatus that are used in everyday business operations is assured in accordance with a synchronous remote copy. In a case where a failure is detected in the first storage apparatus by the host that is performing the business operation, the host reconfigures the apparatus address information inside a control block and switches the pointer so as to enable host application input/output to be executed with respect to the second storage apparatus. Further, the control of a synchronous remote copy is also carried out. In accordance with this technology, it is possible to switch over from the first storage apparatus to the second storage apparatus without staticizing the host application, thereby making it possible to enhance the availability of business operations.

In addition to the above, there is demand in the data storage market for a so-called disaster recovery system, which does not lose data even when a storage apparatus storing a large volume of data is destroyed in a disaster or the like. To meet the requirements of such a market, a computer system that uses remote copy technology to backup data is provided. This computer system stores the same data in storage apparatuses that are installed in two very separate locations. When the data of the one storage apparatus is updated, this update is either synchronously or asynchronously reflected in the other storage apparatus in accordance with a remote copy. For this reason, the identity of the data in the two storage apparatuses is assured.

Furthermore, in order to heighten data protection, a computer system that installs storage apparatuses in three mutually separate locations is disclosed in U.S. Pat. No. 7,167,962. In this computer system, the identity of the data in the first storage apparatus, which is used in everyday business operations, and the remotely located second storage apparatus is assured in accordance with a synchronous remote copy. Alternately, the identity of the data in the first storage apparatus and the remotely located third storage apparatus is assured in accordance with an asynchronous remote copy.

In a case where it becomes impossible to use the first storage apparatus for a business operation as the result of a failure caused by a disaster, the second storage apparatus takes over the operations of the first storage apparatus. In a case where the second storage apparatus is also unable to be used at this time, the third storage apparatus takes over the business operations of the first storage apparatus. As a result of this, it is possible to prevent the loss of data even when a serious disaster occurs.

In a computer system that installs storage apparatuses in three locations like this, data is not replicated between the second storage apparatus and the third storage apparatus during normal operation. For this reason, the identity of the data in the second storage apparatus and the third storage apparatus is not guaranteed. Therefore, in a case where a failure also occurs in the second storage apparatus subsequent to the second storage apparatus having taken over the business operations of the first storage apparatus, the third storage apparatus is not able to take over the business operations of the second storage apparatus.

For this reason, the data identity between the second storage apparatus and the third storage apparatus is assured prior to the second storage apparatus commencing operation to take over the business operations of the first storage apparatus. After the second storage apparatus has commenced operation, the data update of the second storage apparatus is reflected in the third storage apparatus in accordance with a remote copy. As a result of this, when a failure occurs in the second storage apparatus, the third storage apparatus is able to take over the business operations of the second storage apparatus.

In a case where all of the data of the second storage apparatus has been replicated in the third storage apparatus at the time of this takeover, the data identity of these storage devices is assured. However, it takes a long time to replicate all the data like this. This can take more than several hours in the large-capacity storage apparatuses of recent years in particular. A case where the second storage apparatus is unable to be used in business operations until all of its data has been replicated raises concerns of serious economic losses being incurred due to the system being suspended for a long period of time. As a technique for shortening the time required to assure the data identity between this second storage apparatus and third storage apparatus, there is the data update method disclosed in U.S. Pat. No. 7,447,855. This technology reduces the amount of data to be replicated when assuring the identity of the second storage apparatus and the third storage apparatus by mutually reflecting the difference data of the one apparatus in the other apparatus, thereby shortening the time required as a result. In this specification, the technology for assuring data identity as described in this U.S. Pat. No. 7,447,855 will be called a "difference resync between secondary volumes".

In a case where the asynchronous remote copy of U.S. Pat. No. 7,167,962 and U.S. Pat. No. 7,447,855 is applied to the storage clustering technology of U.S. Pat. No. 7,043,665, it is conceivable that the asynchronous remote copy be carried out by regarding the one storage apparatus configuring the cluster as the copy source, but linking cluster control with an asynchronous remote copy for use in disaster recovery does not make it possible for the system to be operated with higher performance or greater reliability.

SUMMARY OF THE INVENTION

An object of the present invention is to provide an asynchronous remote copy that works together with storage clustering technology.

In the present invention, a program running on the host computer that controls the asynchronous remote copy carries out an asynchronous remote copy pair operation by asynchronously working together with a switchover instruction of a storage clustering control program that performs a host write-destination volume switchover in a storage clustering environment.

BRIEF DESCRIPTION OF THE DRAWINGS

FIG. 5 shows details of the configuration of pair information;

DESCRIPTION OF THE SPECIFIC EMBODIMENTS

The embodiment of the present invention will be explained using FIGS. 1 through 10.

The control of input/output from a computer, and the storage area utilization method based on a volume inside the storage apparatus are the same as those disclosed in the prior art.

Embodiment 1

Figure 1:
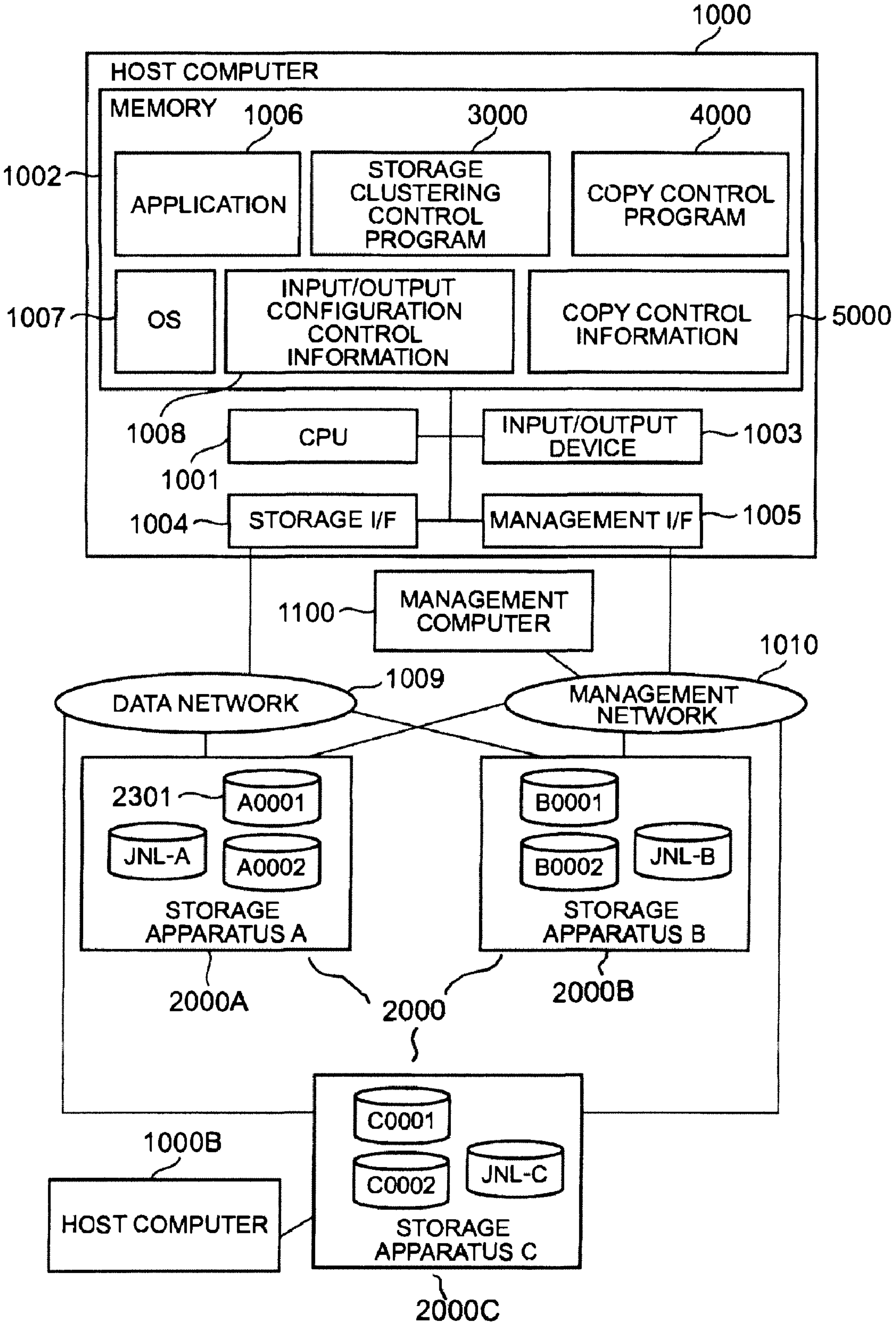
FIG. 1 shows the configuration of a computer system of the first embodiment.

FIG. 1 shows the configuration of a computer system of this embodiment. This system comprises a host computer 1000, a storage apparatus 2000 that is accessed from the host computer 1000, a data network 1009 that couples the host computer 1000 to the storage apparatus 2000, a management computer 1100, and a management network 1010 that couples the management computer 1100 to the host computer 1000 and the storage apparatus 2000. A host computer input/output device 1003 for managing an operation, such as the setup of the host computer 1000, is attached to the host computer 1000. A management computer input/output device for managing an operation, such as the setup of the management computer, is attached to the management computer.

The data network 1009 is a network for use in data communications, and in this embodiment is a SAN (Storage Area Network). Furthermore, as long as it is a data communications network, the data network 1009 may be a network other than a SAN, and, for example, may be an IP network.

Further, the management network 1010 is a network for use in data communications, and in this embodiment is an IP network. Furthermore, as long as it is a data communications network, the management network 1010 may be a network other than an IP network, and, for example, may be an SAN (Storage Area Network).

Further, the data network 1009 and the management network 1010 may be the same network. Also, the management computer and the host computer 1000 may be realized in accordance with a single computer.

Furthermore, for ease of explanation, in this embodiment, there are three storage apparatuses 2000 (2000A-2000C) and one host computer 1000, but there may also be a plurality thereof.

The storage apparatus 2000 comprises a volume 2301, which is an area for storing data. Further, the volume 2301 also has an application as a data volume (shown as "A0001" and "A0002" in the drawing) for storing data written from the host computer 1000, and as a journal volume (shown as "JNL-A" in the drawing) for storing data during copying when a remote copy is being performed. In a case where the remote copy of this embodiment is carried out such that data is copied from the "A0001" in a pair configuration with a "C0001", it is assumed that the write data of the "A0001" is also stored in the "JNL-A", transferred to a "JNL-C" and reflected in the "C0001" based on the "JNL-C". The storage apparatus is only described here with respect to the volume. A detailed explanation of the storage apparatus will be given below.

Furthermore, in the following explanation, in a case where two storage apparatuses are specified as targets for clustering, the storage apparatuses will be called storage apparatus A and storage apparatus B, in a case where a remote storage apparatus is specified, this storage apparatus will be called storage apparatus C, and in a case where a specific storage apparatus is not specified, the storage apparatus will be called either the storage apparatus or the storage apparatus 2000.

The volume 2301 is able to configure a copy pair. The copy pair comprises a replication-source volume 2301 and a replication-destination volume 2301, which stores a replication of the data stored in this replication-source volume 2301.

The host computer 1000 comprises a CPU 1001, a memory 1002, an input/output device 1003, such as a keyboard, a mouse, or a display, a storage I/F 1004, and a management I/F 1005, and these components are coupled together.

The storage I/F 1004 is a network interface for coupling the host computer 1000 to the data network 1009. The storage I/F 1004 sends and receives data and a control instruction to and from the storage apparatus 2000 via the data network 1009.

The management I/F 1005 is a network interface for coupling the host computer 1000 to the management network 1010. The management I/F 1005 sends and receives data and a control instruction to and from the storage apparatus 2000 via the management network 1010.

The memory 1002 stores an application 1006, a storage clustering control program 3000, a copy control program 4000, an OS 1007, input/output configuration control information 1008, and copy control information 5000.

The application 1006 reads and writes data from and to the volume 2301 disposed in the storage apparatus 2000 in accordance with issuing a request to the OS 1007. For example, the application 1006 is either a DBMS (Data Base Management System) or a file system.

The OS 1007 is an operating system for managing this system. The OS 1007 comprises as one part thereof a function for identifying from the input/output configuration control information 1008 a machine that is the target of an input/output and for carrying out the input/output of data to/from the storage apparatus in accordance with a request from the application 1006 or the like.

The storage clustering control program 3000 controls storage clustering as disclosed in the prior art. That is, in a case where a synchronous copy between volumes, which are targeted for storage clustering, is being controlled, and a failure occurs in the volume that is the input/output target, the storage clustering control program 3000 carries out processing that temporarily suspends the input/output and reverses the copying direction of the synchronous copy, and resumes input/output after the input/output has been switched to the original synchronous copy destination by rewriting the volume information inside the input/output configuration control information.

The copy control program 4000 carries out copy control based on the order of the copy operation. Also, to control a copy, the copy control program 4000 sends to a storage microprogram 2206 a request to control the copy pair and a request to acquire the status of the copy pair.

The copy control information 5000 is an area for storing information for the copy control program 4000 to carry out copy control. Details will be explained further below. The application 1006, the storage clustering control program 3000, the copy control program 4000, and the OS 1007 are executed by the CPU 1001.

Furthermore, for ease of explanation, FIG. 1 shows one application 1006, but there may be a plurality of applications.

The storage apparatus C uses data that has been replicated in accordance with an asynchronous remote copy, and is coupled to a host computer 1000B that will execute the business processing that the host computer 1000 had been executing.

A disaster recovery environment, which is premised on a disaster at a local site, is typically constructed by having the host computer 1000, the storage apparatus A and the storage apparatus B reside at one site (the local site), and having the host computer 1000B and the storage apparatus C belong to a different site (the remote site). However, the relationships between the sites and respective computers and storage apparatuses may also differ from this.

Figure 2:
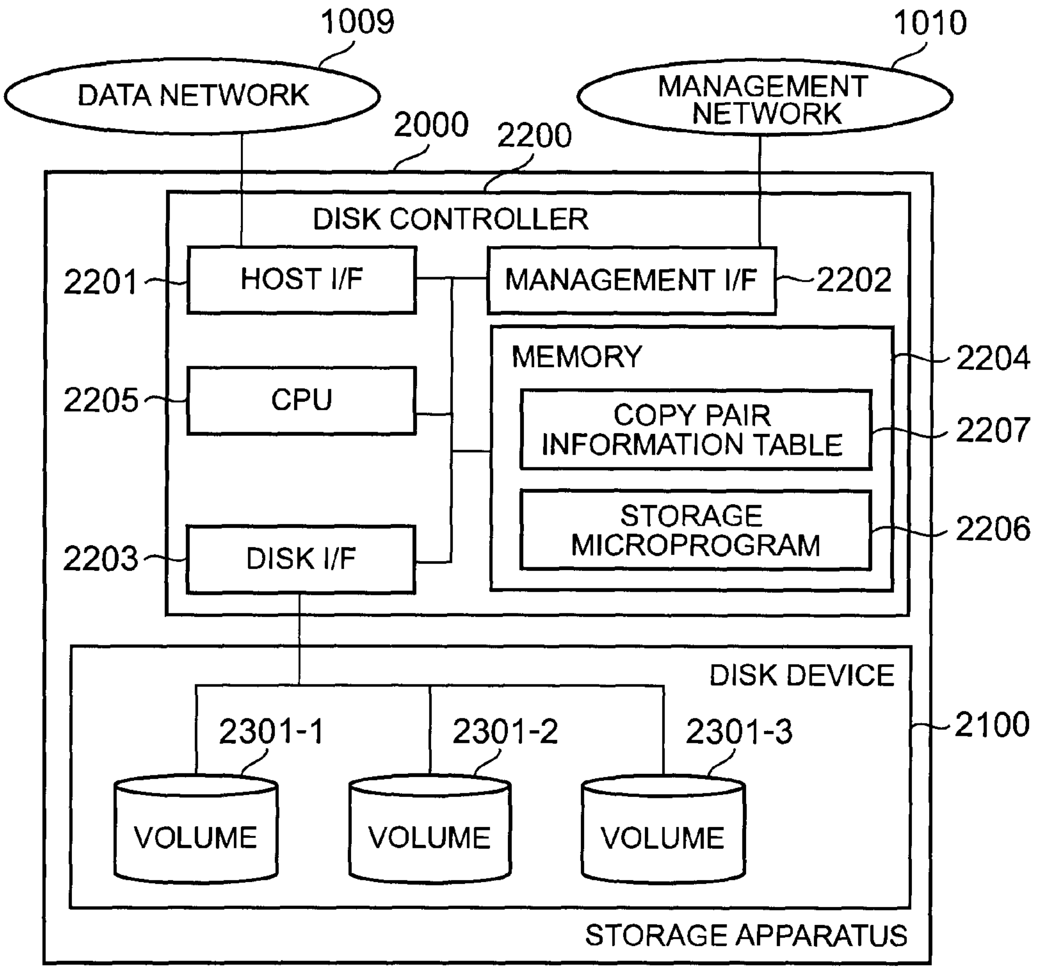
FIG. 2 shows details of the configuration of a storage apparatus.

FIG. 2 shows the details of the configuration of the storage apparatus in FIG. 1.

The storage apparatus 2000 comprises a disk device 2100 and a disk controller 2200. The disk device 2100 stores a data write-requested by the host computer 1000, and sends stored data that is read-requested from the host computer 1000 to the host computer 1000. The disk controller 2200 controls the processes of the storage apparatus 2000.

The disk device 2100 comprises a plurality of volumes 2301. The volume 2301 may be any of a hard disk drive (HDD) and a flash drive (SSD), which are physical storage areas, or a logical device (Logical Device), which is a logical storage area, and in the present invention, any type of volume may be used. Furthermore, for ease of explanation, FIG. 2 shows three volumes 2301, but any number of volumes 2301 may be used.

The disk controller 2200 comprises a host I/F 2201, a management I/F 2202, a disk I/F 2203, a memory 2204, and a CPU 2205.

The memory 2204 stores the storage microprogram 2206 and copy pair information 2207.

The storage microprogram 2206 is executed by the CPU 2205. The storage microprogram 2206 controls a copy pair, and acquires and reports the status of the copy pair in accordance with a request from the host computer 1000.

The control of a copy pair by the storage microprogram 2206 will be explained further below.

The copy pair information 2207 stores information on the volume 2301 that configures the copy pair from among the volumes 2301 disposed in the storage apparatus 2000.

Furthermore, in this embodiment, it is supposed that the storage microprogram 2206 and the copy pair information 2207 are stored in the memory 2204 of the disk controller 2200, but the present invention is not limited to this. For example, the storage microprogram 2206 and the copy pair information 2207 may be stored in a flash memory that is coupled to the disk controller 2200, or may be stored in the volume 2301 that is disposed in the disk device 2100.

The host I/F 2201 is a network interface for coupling the storage apparatus 2000 to the data network 1009. The host I/F 2201 sends and receives data and a control instruction to and from the host computer 1000 via the data network 1009.

The management I/F 2202 is a network interface for coupling the storage apparatus 2000 to the management network 1010. The management I/F 2202 sends and receives data and a control instruction to and from the host computer 1000 and the management computer 1200 via the management network 1010.

The disk I/F 2203 is an interface for coupling the disk controller 2200 to the disk device 2100.

Next, a remote copy in accordance with the storage apparatus will be explained.

A synchronous remote copy is a copy scheme, which, in a case where a write request has been received from the host with respect to the primary volume, carries out a data copy of this write data to the secondary volume, and thereafter, returns a write-complete to the host.

When a synchronous remote copy is executed, the disk controller manages information called a pair status (Simplex, Initial-Copying, Duplex, Suspend and Duplex-Pending) for showing and operating on the data of the primary and secondary volumes and the status of the copy. The nature of the synchronous remote copy process will be explained below for each pair status.

<Simplex Status>

The Simplex status is when a copy between the primary and secondary volumes has not commenced.

<Duplex Status>

The Duplex status is when a synchronous remote copy has commenced, initial-copying, which will be explained below, has been completed, and the data contents of the primary and secondary volumes are identical. In the case of a synchronous remote copy, subsequent to the contents of a write carried out with respect to the primary volume having been copied to the secondary volume, a message to the effect that the copy ended normally is returned to the host that performed the write. Therefore, with the exception of an area part way through the write, the contents of the primary volume data and the contents of the secondary volume data become the same.

<Initial-Copying Status>

The Initial-Copying status is an intermediate status in the transition from the Simplex status to the Duplex status, and during this period, an initial copy (a copy of the data already stored in the primary volume) from the primary volume to the secondary volume is carried out as necessary. When the processing required for completing the initial-copying and transitioning to the Duplex status has ended, the pair status becomes Duplex. Furthermore, the pair status transitions to this status upon receiving a "create" instruction from the host computer in the Simplex status.

<Suspend Status>

The Suspend status is when the content of the write with respect to the primary volume is not reflected in the secondary volume. In this status, the data of the primary and secondary volumes are not the same. The pair status transitions from another status to the Suspend status triggered by a "suspend" instruction from the operator or the host.

Otherwise, it is conceivable that the pair status will automatically transition to the Suspend status in a case where it has become impossible to carry out the synchronous remote copy.

In the following explanation, the latter instance will be called a failure Suspend status. A failure Suspend status is typically caused by a failure of the primary or secondary volumes, a failure of the primary or secondary disk controller, and a communication failure between the primary and secondary volumes. A primary or secondary disk controller that has transitioned to the Suspend status stores the write location with respect to the primary and secondary volumes subsequent to transitioning to this status.

<Duplex-Pending Status>

The Duplex-Pending status is an intermediate status in the transition from the Suspend status to the Duplex status. In this status, a data copy from the primary volume to the secondary volume is executed to make the data contents of the primary volume and the secondary volume match. After the data of the primary and secondary volumes has become identical, the pair status transitions to Duplex. Furthermore, the copying of data in the Duplex-Pending status makes use of the write location recorded by the primary and secondary disk controllers in the Suspend status, and a difference copy is used to copy only the portions of data required for updating. Furthermore, the pair status transitions to this state upon a "resync" instruction having been received from the host computer in the Suspend status (to include the failure Suspend status).

In the above explanation, the Initial-Copying status and the Duplex-Pending status are explained as different statuses, but these statuses may be brought together and displayed on the screen of a management apparatus as a single status or used to transition the status.

Next, an asynchronous remote copy will be explained.

In the case of an asynchronous remote copy, the reflection of the write data with respect to a secondary storage area in the Duplex status is carried out unrelated (asynchronously) to the storage apparatus 2000 sending a message to the host 1000 to the effect that the write ended normally.

In the case of an asynchronous remote copy, the methods for copying data from the primary storage area to the secondary storage area include the following.

For example, there is a method by which the primary storage area creates a set (hereinafter called a "journal entry") comprising the written data and control information that includes the address of the storage area to which the data has been written each time there is a data write, transfers this journal entry to the secondary storage area, and reflects this journal entry in the secondary storage area (The storage destination is the cache memory and/or the journal volume.). As an extension of this method, there is another method in which information showing the chronological order of a write is included in the control information of the journal entry, and this information showing the chronological order is used when reflecting the journal entry to the secondary storage area to reflect the journal entry in accordance with the chronological order.

Further, as a more efficient method for this method, there is one in which, in a case where writes are consecutively generated to the same area of the primary storage area, the primary storage device transfers only the journal entry for the final write to the secondary storage device without transferring the journal entries with respect to the writes midway through.

As one more example, there is a method in which data written to the primary volume as a fixed time is held and copied to the secondary volume as difference data. In the case of this method, the difference data is copied to the volume after being transferred in its entirety to the secondary disk controller.

The asynchronous remote copy is also operated and managed using the pair status (Simplex, Initial-Copying, Duplex, Suspend, Duplex-Pending, and Suspending). The Simplex, Initial-Copying, Suspend, and Duplex-Pending statuses are the same as those for the synchronous remote copy.

<Duplex Status>

The Duplex status is also basically the same as in the case of the synchronous remote copy, but since the copy of the write data to the secondary volume is asynchronous, the secondary volume lags slightly behind the primary volume.

<Suspending Status>

The Suspending status is an intermediate status in the transition from the Duplex status to the Suspend status. In the case of an asynchronous remote copy, the pair status transitions to the Suspend status by way of the Suspending status. A journal entry, which could not be copied to the write location record with respect to the primary and secondary volumes described in the explanation of the Suspend status of the synchronous remote copy, is added to the write location record.

Figures 3, 4:
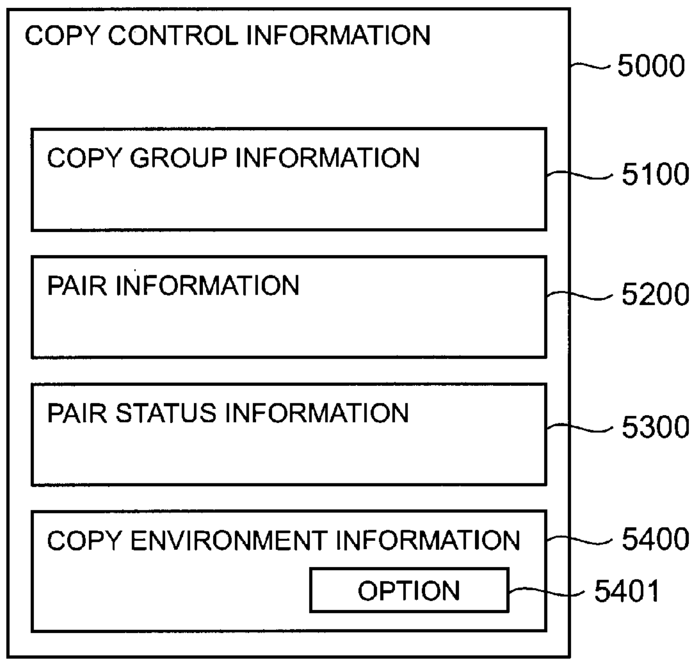
FIG. 3 shows details of the configuration of copy control information.
FIG. 4 shows details of the configuration of copy group information.

FIG. 3 shows the details of the configuration of the copy control information of FIG. 1.

The copy control information 5000 comprises copy group information 5100, pair information 5200, pair status information 5300, and copy environment information 5400.

The copy group information 5100 denotes information related to a copy group that groups together a plurality of copy pairs. The copy group information 5100 will be explained in detail using FIG. 4.

The pair information 5200 comprises information about copy pairs that are brought together and operated on as a group for each copy group. The pair information 5200 will be explained in detail using FIG. 5.

The pair status information 5300 is an area that holds the pair status information for each pair recorded in the pair information 5200, and stores a status obtained as the result of a pair status acquisition instruction issued by the copy control program 4000 to the storage apparatus 2000.

The copy environment information 5400 is an area that stores a parameter for carrying out copy control. In this embodiment, the copy environment information 5400 comprises an option 5401, and in a case where a difference resync between secondary volumes is executed, either one of two values is set here, i.e., "cancel" for cancelling a resync process in a case where the difference resync is not possible, or "proceed" for executing the resync process by copying a volume in its entirety instead of performing a difference resync in a case where the difference resync is not possible. These values, which are in addition to the information obtained as instruction results stored in the pair status information 5300, are set by the user via either the input/output device 1003 or the management computer.

FIG. 4 shows the details of the configuration of the copy group information 5100 in FIG. 3.

The copy group information 5100 comprises a set comprising a group identifier 5101, a first attribute 5102, and a second attribute 5103. The group identifier 5101 is an area for storing the identifier of a copy group. The first attribute 5102 is an area for storing the type of copy, i.e., a synchronous copy or an asynchronous copy. The second attribute 5103 is an area for storing the attribute of a function that differs from the first attribute 5102, such as whether or not a copy group is targeted for the application of the storage clustering function.

FIG. 5 shows the details of the configuration of the pair information 5200 in FIG. 3.

The pair information 5200 comprises a group identifier 5201, a primary device identifier 5202, and a secondary device identifier 5203. FIG. 3 is an example of a case in which there are three copy groups, G1 through G3. For example, G1 comprises two pairs, i.e., a pair that has the device identifier "A0001" as the primary volume and the device identifier "B0001" as the secondary volume, and a pair that has the device identifier "A0002" as the primary volume and the device identifier "B0002" as the secondary volume. In accordance with this device identifier, it is possible to identify the device that will be the target, and any volume inside this device.

Figure 6:
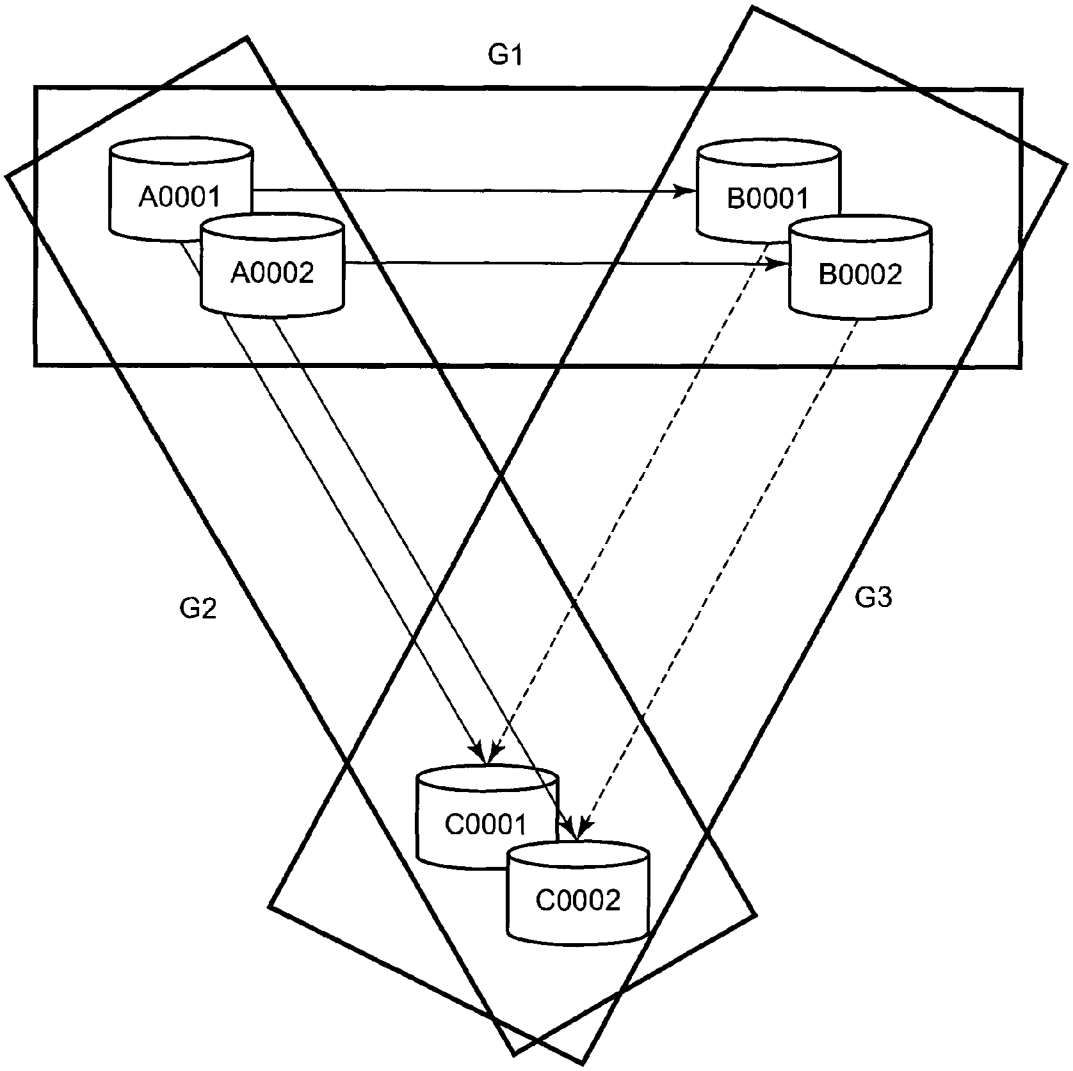
FIG. 6 is a schematic diagram showing the relationships of copy groups that use the storage clustering and the difference resync between secondary volumes.

FIG. 6 is a schematic diagram based on examples of information given in FIG. 4 and FIG. 5, and shows the relationships of copy groups that use storage clustering and the difference resync between secondary volumes in this embodiment.

G1 is a copy group to which storage clustering is being applied, a synchronous copy is set on the storage apparatus, and the write to the "A0001" volume is synchronously reflected in the "B0001" volume. Similarly, the write to the "A0002" volume is synchronously reflected in the "B0002" volume. That is, G1 comprises two copy pairs, i.e., "A0001" and "B0001", and "A0002" and "B0002".

In addition, as G2, an asynchronous copy is set for the "A0001" volume and the "A0002" volume. That is, G2 comprises the two copy pairs of "A0001" and "C0001", and "A0002" and "C0002", and the writes are asynchronously copied.

The configuration shown in this G1 and G2 is called a multi-target configuration.

Further, G3 is set for using a difference resync between secondary volumes that targets the G1 and G2 copy groups. The G3 has the G1 secondary volumes and the G2 secondary volumes as targets, and comprises the two copy pairs of "B0001" and "C0001" and "B0002" and "C0002". The reflection of a write to a volume is not normally carried out for G3. This is called "difference resync standby", and is denoted in FIG. 6 using broken lines. At the time of a difference resync between secondary volumes instruction, the G3 prepares the difference data, commences an asynchronous copy as a pair in place of the G2, and becomes the pair status. At this time, the G2 changes to "difference resync standby". Details on how the instruction is issued will be explained below.

Furthermore, the storage apparatus, which provides the primary volume of the pair that is in the difference resync standby mode, creates a journal entry from the write data received via the synchronous remote copy from the other storage apparatus comprising the cluster, and stores this journal entry in the journal volume.

Figure 7:
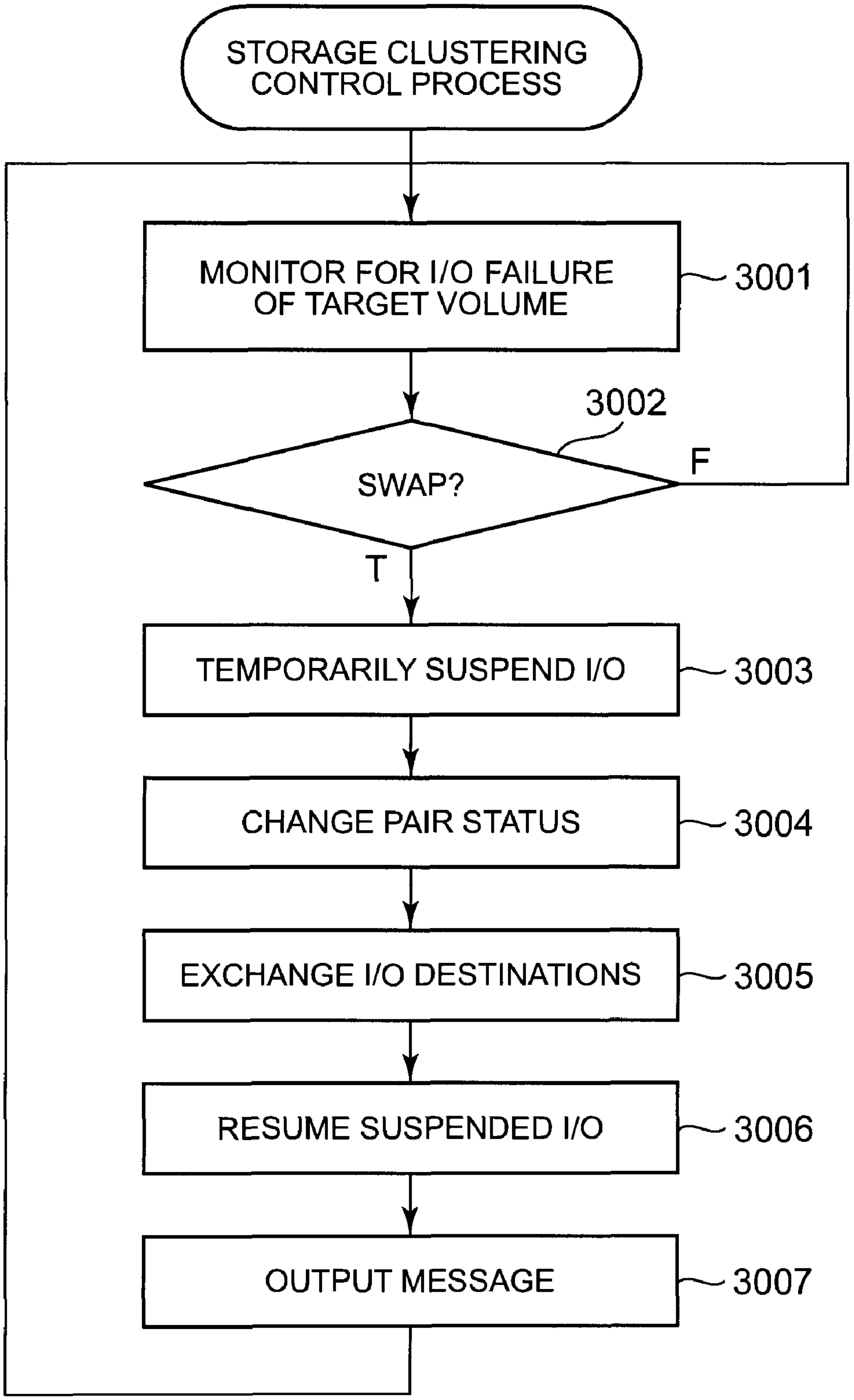
FIG. 7 is a flowchart showing the operation of a storage clustering control program.

FIG. 7 is a flowchart showing the operation of the storage cluster control program 3000.

The storage cluster control program 3000 monitors the results of a read and/or write to the volumes to which clustering is being applied (Step 3001).

Next, the storage clustering control program 3000 detects either a state in which the read and/or write failed and a swap has become necessary, or a state in which there was an instruction from the user that necessitates a swap (Step 3002). That is, the storage clustering control program 3000 determines to commence processing in accordance with either an unplanned switchover or a planned switchover. "Swap" refers to switching over to the storage apparatus that issued either the read or write request.

In a case where the determination in the above-mentioned Step 3002 is false, the storage clustering control program 3000 returns to Step 3001 and continues monitoring the read and/or write requests.

In a case where the determination in the above-mentioned Step 3002 is true, the storage clustering control program 3000 carries out the following switchover process.

First, storage clustering control program 3000 temporarily suspends the processing of the read and/or write request to the volume that is being targeted (Step 3003).

The storage clustering control program 3000 changes the pair status comprising the storage clustering-targeted volume (Step 3004). This will be explained using the example shown in FIG. 6. That is, the storage clustering control program 3000 sends a "suspend" instruction to the storage apparatus and changes to a status in which the "A0001" data that was being synchronously copied to the "B0001" is able to be written to the "B0001". The same processing is also carried out for the pair of "A0002" and "B0002".

Next, the storage clustering control program 3000 carries out the exchange and rewrite of the input/output configuration control information 1008 (Step 3005). Normally, the application transfers information specifying the issue destination of a read and/or write request to the OS 1007 together with the read and/or write request. When the OS 1007 processes the transferred read and/or write request, it determines the device identifier corresponding to the read and/or write request issue destination included in the input/output configuration control information 1008, and carries out the read and/or write request processing having this device identifier as the target. In this step, the storage clustering control program 3000 exchanges the clustering-targeted volume information and the information of the volumes regarded as the copy pair. This will be explained using "A0001" and "B0001" as examples. The information that pointed to the "A0001" prior to the exchange will point to the "B0001" subsequent to the exchange, and, by contrast, the information that pointed to the "B0001" prior to the exchange will point to the "A0001" subsequent to the exchange.

Thereafter, the storage clustering control program 3000 resumes the read and/or write request processing that was suspended in the above-mentioned Step 3003 (Step 3006).

Lastly, the storage clustering control program 3000 outputs a message indicating that the exchange process has ended (Step 3007), and returns the read and/or write request monitoring of Step 3001.

Furthermore, in Step 3005, a "resync" instruction that accompanies the reversal of the copying direction may be sent to the storage apparatus. Hypothetically, in a case in which a factor for carrying out this processing is a network failure between the host computer 1000 and the switchover-source storage apparatus 2000, a synchronous remote copy is commenced in the opposite direction and data redundancy is assured.

Figure 8:
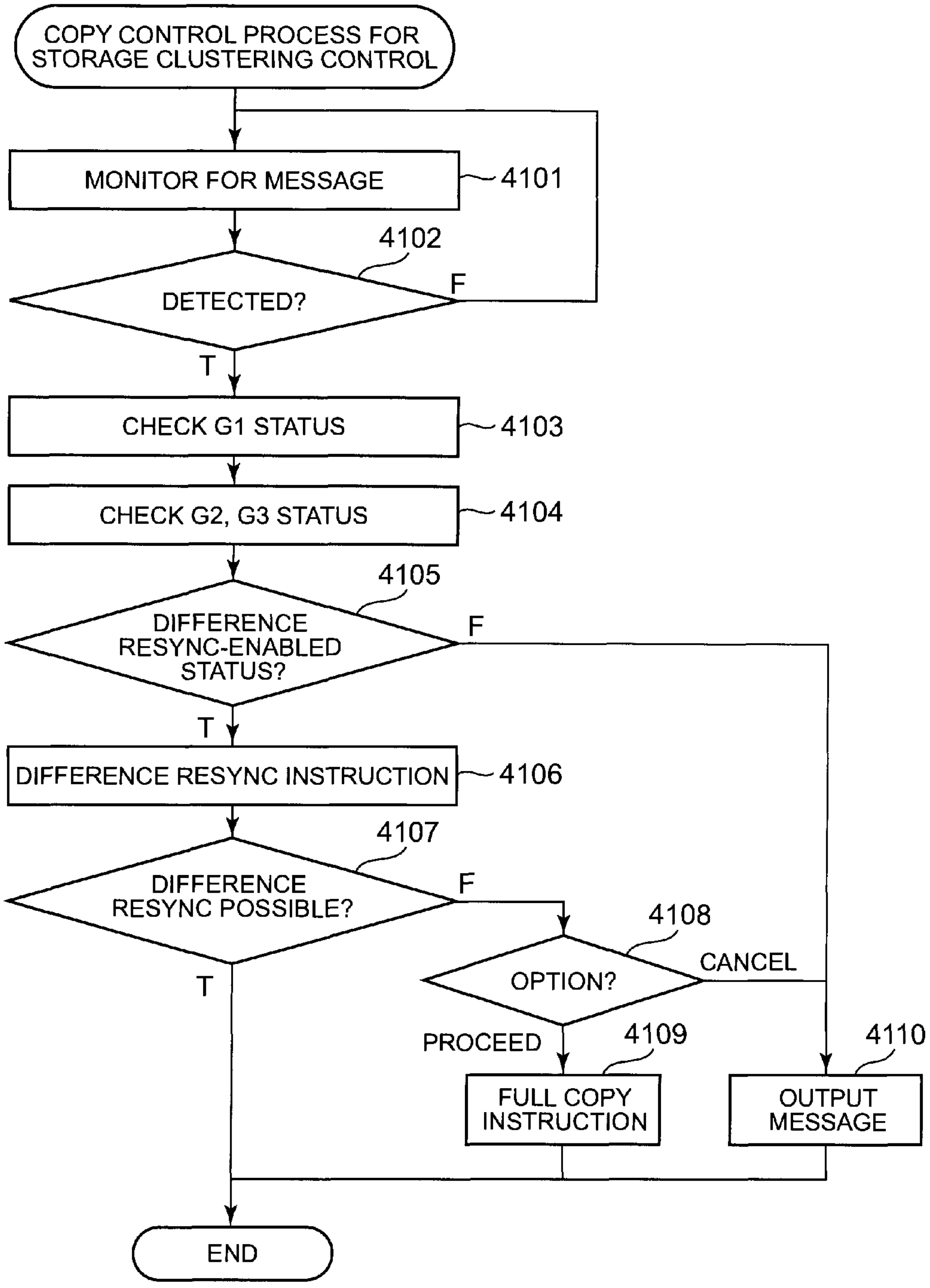
FIG. 8 is a flowchart showing the operation of the copy control program in response to the storage clustering control.

FIG. 8 is a flowchart showing the operation of the copy control program 4000 in response to storage clustering control.

The copy control program 4000 monitors for the output of an exchange-complete message from the storage clustering control program 3000 (Step 4101).

The copy control program 4000 determines whether a message has been detected (Step 4102).

In a case where the determination in the above-mentioned Step 4102 is false, the copy control program 4000 returns to Step 4101 and continues message monitoring.

In a case where the determination in the above-mentioned Step 4102 is true, the copy control program 4000 performs the following processing.

First, the copy control program 4000 issues an instruction to check the status of the G1, acquires the G1 status information from the storage apparatus 2000, and checks whether or not it is the status subsequent to the exchange processing by the storage clustering control program 3000 (Step 4103).

Next, the copy control program 4000 issues an instruction to check the statuses of the G2 and the G3, acquires the G2 and G3 status information from the storage apparatus 2000, and checks whether or not it is the status in which a difference resync is not possible, such as when the copy pair is suspended due to a failure (Step 4104).

Based on the results of the above-mentioned Step 4103 and Step 4104, the copy control program 4000 determines whether or not the status is such that the G1 is in the post-exchange processing status, the statuses of the G2 and the G3 are not abnormal, and a difference resync between secondary volumes should be carried out (Step 4105).

In a case where the determination in the above-mentioned Step 4105 is true, the copy control program 4000 carries out the following processing.

The copy control program 4000 issues a difference resync instruction (Step 4106). The instruction at this point is to switch from the G2 being the pair status and the G3 being in the difference resync standby mode to the G3 being the pair status and the G2 being in the difference resync standby mode. By resetting this switchover so that not all of the volume information is copied, and instead, only the difference data between the G2 secondary volume (that is, the G3 secondary volume) and the G3 primary volume is copied, there is carried out a difference resync between secondary volumes that enables copying in a shorter period of time than when all the data is copied.

Next, the copy control program 4000 acquires information from the storage apparatus 2000, and determines whether or not it was possible to execute the difference resync between secondary volumes in Step 4106 (Step 4107). In this flowchart, the difference resync is executed asynchronously with the exchange of the storage clustering volumes to inhibit incorporation in the storage clustering control program. For this reason, there is a time difference between the execution of the volume exchange and the execution of the difference resync. This difference is normally solved by enlarging the capacity of the journal volume of the asynchronous copy, but in a case where operations are carried out by minimizing the capacity of the journal volume, the difference resync may fail. This phenomenon is detected in this step.

In a case where the determination in the above-mentioned Step 4107 is true, the copy control program 4000 ends the processing of this flowchart because the difference resync was successful.

In a case where the determination in the above-mentioned Step 4107 is false, the copy control program 4000 carries out the following processing because the difference resync could not be performed.

The copy control program 4000 determines whether or not the option information set in the copy environment information 5400 is "proceed" or "cancel" (Step 4108).

In a case where the determination in the above-mentioned Step 4108 is "proceed", the copy control program 4000 carries out instructions to switch the G2 to the standby mode and switch the G3 to the pair status by performing a full copy that establishes the pair status by copying all of the data on the G3 primary volume to the G3 secondary volume, and ends the processing (Step 4109).

In either a case where the determination in the above-mentioned Step 4108 is "cancel", or a case where the determination in the above-mentioned Step 4105 is false, the copy control program 4000 outputs a message denoting that the switchover could not be carried out, and ends the processing (Step 4110).

Figure 9:
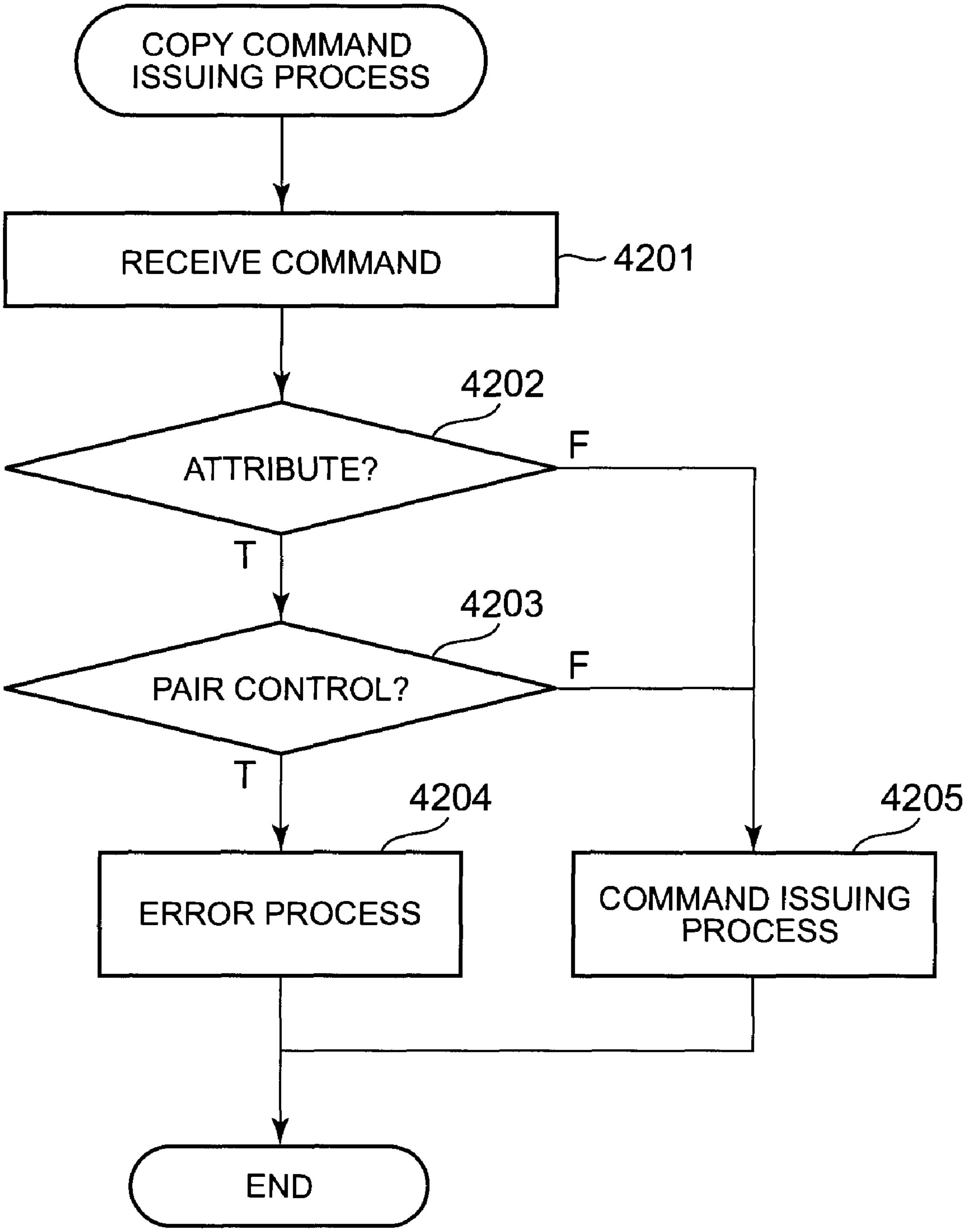
FIG. 9 is a flowchart showing the portion of the operations via which the copy control program actually carries out a command issuing process.

FIG. 9 is a flowchart showing the portion of the operation via which the copy control program 4000 actually carries out a command issuing process.

The command control program 4000 receives an instruction related to copy control, such as a "create", "suspend" or "resync" instruction, or a pair status acquisition instruction (Step 4201).

The command control program 4000 references the second attribute 5103 of the copy group information 5100 that corresponds to the copy group specified in the instruction, and determines whether or not the corresponding copy group is the target of storage clustering (Step 4202).

In a case where the determination in the above-mentioned Step 4202 is true, the command control program 4000 carries out the following processing.

The command control program 4000 determines whether or not the content of the processing specified in the instruction is a control instruction for changing the status of a pair, such as suspend or resync (Step 4203).

In a case where the determination in the above-mentioned Step 4203 is true, the command control program 4000 regards this instruction as one that is not permitted, processes it as an error, and ends the processing (Step 4204).

In either a case where the determination in the above-mentioned Step 4203 is false and the content of the processing specified in the instruction is a reference instruction, such as acquire pair status information, or a case where the determination of the above-mentioned Step 4202 is false, the command control program 4000 issues a command in accordance with the request and ends the processing (Step 4205).

Figure 10:
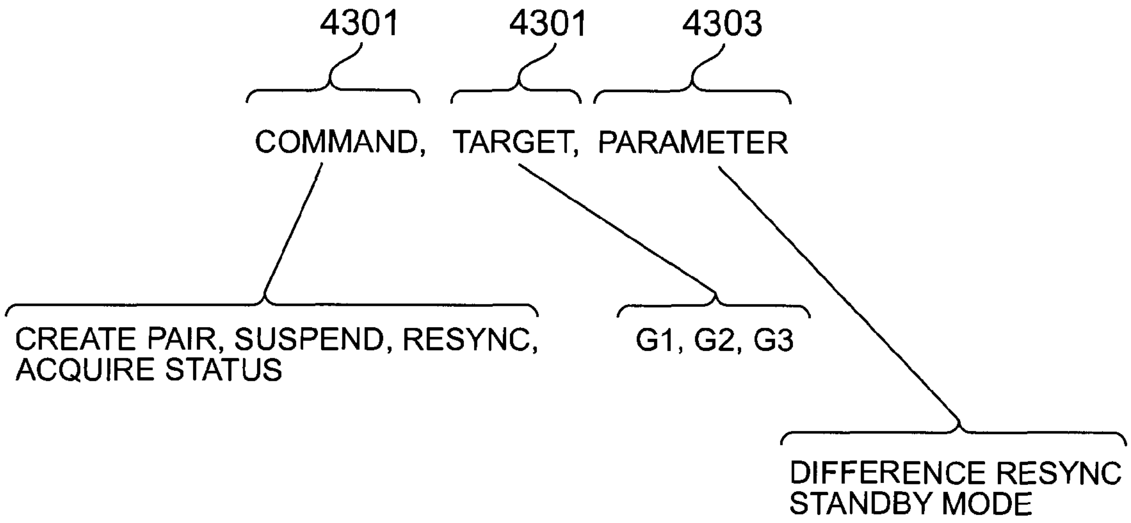
FIG. 10 is a schematic diagram of a command line interface.

FIG. 10 is a schematic diagram of a command line interface that the copy control program 4000 provides to either the user or a script program.

The command line interface comprises a command 4301, a target 4302, and a parameter 4303.

The command 4301 describes an instruction, such as create pair or acquire status.

The target 4302 described a target group or pair.

The parameter 4303 describes any parameters required by the instruction.

In a case where the status with respect to the copy group G1 is to be acquired, the command line interface instructs "acquire status, G1". In a case where the copy group G3 is to be set to the difference resync standby mode, the command line interface instructs "create pair, G3, difference resync standby mode".

In accordance with the copy function, these instructions and parameters may be a variety of modes other than those disclosed in FIG. 10.

In the above copy control program 4000 operations for responding to the storage clustering control explained using FIG. 8 in this embodiment, a mode in which a difference resync is implemented after checking beforehand that the status is a difference resync-enabled status prior to issuing the difference resync between secondary volumes instruction was explained. However, this mode may also be such that the difference resync is carried out after the storage clustering operation has been detected, and in a case where the result was unsuccessful, the status of the related copy group is checked once again, and in a case where the result is an error that enables a difference resync by the storage, such as an abnormal pair status, a pair status check and other such recovery processes are carried out, and the difference resync between secondary volumes is instructed once again. In accordance with this, it is possible to return more quickly to a disaster recovery-enabled state by carrying out the difference resync without waiting the time it takes to confirm the status of the G1 or other such copy group.

Further, in the copy control program 4000 operations for responding to storage clustering control described using FIG. 8 in this embodiment, the statuses of the related copy groups G2 and G3 were acquired in Step 4104. This mode may also be such that a suspend pair instruction is implemented with respect to the G2 for changing to a status that enables the execution of the difference resync between secondary volumes prior to status acquisition. The switchover of volumes in accordance with storage clustering is either implemented in a planned fashion by the user in preparation for maintenance, or implemented in an unplanned fashion due to a failure. In accordance with this, the status of G2 will transition to the suspend status in the case of a storage failure, and the status of G2 will remain pair in the case of a line failure of some sort between the host computer 1000 and the storage apparatus 2000 when the data network 1009 is operating normally. That is, even in a case where the difference resync should be implemented in line with the storage clustering operations, it is possible for the G2 to have a plurality of statuses. By performing steps for determining the pair status that enables the difference resync, the copy control program 4000 is able to implement either a planned or unplanned volume switchover in a single step. In accordance with this, it is possible to reduce the need for a user operation when an error occurs.

In accordance with the preceding explanation, a computer system comprising a first host computer that executes an application program, a storage clustering control program and a copy control program, a first storage apparatus, which is coupled to the first host computer, and which provides a first volume, a second storage apparatus, which is coupled to the first host computer and the first storage apparatus, and which provides a second volume, and a third storage apparatus, which is coupled to the first storage apparatus and the second storage apparatus, and which provides a third volume, has been explained.

Then, it was explained that the first storage apparatus, by executing a synchronous remote copy process for a first copy pair that has the first volume as a copy source and the second volume as a copy destination, sends, to the second storage apparatus, write data that the host computer has sent in accordance with the execution of the application program, the first storage apparatus, by executing an asynchronous remote copy process for a second copy pair that has the first volume as a copy source and the third volume as a copy destination, sends, to the third storage apparatus, write data that the host computer has sent in accordance with the execution of the application program, and, by executing the storage clustering control program, the first host computer detects the fact that the write of the write data has ended abnormally, and sends, to the second storage apparatus, a first instruction for making it possible to write the write data after detection to the second volume by changing a pair status of the first copy pair, and by executing the copy control program, the first host computer detects that the abnormal end has been detected by the storage clustering control program subsequent to the first instruction having been sent, and sends, to the second storage apparatus, a difference resync instruction for commencing a copy process in accordance with a different asynchronous remote copy process for a third copy pair that has the second volume as a copy source and has the third volume as a copy destination.

Further, it was explained that the computer system may have a second host computer, which is coupled to the third storage apparatus, and which reads data stored in the third volume by executing the application program.

Further, it was explained that the first host computer comprises copy definition information denoting that the first copy pair is a control target of the storage clustering control program, and, by executing the copy control program, the first host computer receives a pair status instruction targeted at the first copy pair and the second copy pair, and displays either the pair status of the first copy pair or the pair status of the second copy pair, and, by executing the copy control program, the first host computer may, based on the copy definition information, execute processing a status change instruction targeted at the second copy pair and the third copy pair, and may deter processing of the status change instruction targeted at the first copy pair.

Further, it was explained that, by executing the copy control program, the first host computer may acquire, from the second storage apparatus, information denoting that a difference resync between secondary volumes targeted at a third copy pair based on the transmission of the difference resync instruction is unable to be processed by a difference copy, and may display a message to the effect that the difference resync between secondary volumes for the third copy pair has failed due to a status change of the first copy pair by the storage clustering control program.

Further, it was explained that, by executing the copy control program, the first host computer may acquire, from the second storage apparatus, information denoting that a difference resync between secondary volumes targeted at a third copy pair based on the transmission of the difference resync instruction is unable to be processed by a difference copy, and may send a second instruction for resuming the copying of the third copy pair by copying the second volume in its entirety.

Linking clustering control and asynchronous remote copy control like this improves the reliability of the computer system by making it possible to continue an asynchronous remote copy even in a case where the functions of the first storage apparatus have been suspended. Further, because the copy control program is a separate program from the storage clustering control program, which comprises an advanced process for detecting a failure, not only is process modularity enhanced and stable operation made possible, but it also becomes possible to make flexible setting changes even in a case where the system configuration is changed from a state in which the computer system does not implement an asynchronous remote copy to a state in which it does (or vice versa).

Further, in the case of an asynchronous remote copy, communications with the target storage apparatus are carried out over a long distance raising the likelihood of a temporary communication outage occurring, and an asynchronous remote copy requires more complex processing than a synchronous remote copy, all of which may result in the pair operation instruction requiring time. For this reason, the fact that the storage apparatus switchover notification from the storage clustering control program to the copy control program is made subsequent to the switchover instruction leads to stable operation in accordance with either shortened suspend time for the read and/or write request from the application program, or a shorter suspension of storage clustering control program processing than the program designers anticipated.

However, this embodiment also discloses other content beside this.

What is claimed is:

1. A computer system comprising: a first host computer which executes an application program, a storage clustering control program, and an asynchronous copy control program, which is a separate program from the storage clustering control program, the first host computer sending write data in accordance with the execution of the application program;

a first storage apparatus which provides a first volume for storing the write data;

sends the write data to a second storage apparatus by executing a synchronous remote copy process for a first copy pair that has the first volume as a copy source and a second volume as a copy destination; and creates first journal entries from the write data and sends the first journal entries to a third storage apparatus by executing an asynchronous remote copy process for a second copy pair that has the first volume as a copy source and a third volume as a copy destination, wherein the second storage apparatus is configured to provide the second volume, store the write data to the second volume, and create second journal entries from the write data sent from the first storage apparatus; and the third storage apparatus provides the third volume and stores the write data sent as the first journal entries to the third volume, wherein the first host computer, by executing the storage clustering control program, detects a failure of writing the write data to the first volume and sends a first instruction to the second storage apparatus, so that the second storage apparatus enables writing the write data to the second volume by changing a pair status of the first copy pair and continuing to create the second journal entries, and wherein the first host computer, by executing the asynchronous copy control program, asynchronously detects information from the asynchronous copy control program, which information indicates that the failure has occurred and that the first instruction has been sent; and sends a difference resync instruction to the second storage apparatus, so that the second storage apparatus starts a different asynchronous remote copy process for a third copy pair that has the second volume as a copy source and the third volume as a copy destination, by sending second journal entries created after receiving the first instruction and before receiving the difference resync instruction.

2. A computer system according to claim 1, wherein, by executing the asynchronous copy control program, the first host computer displays a message that the difference resync instruction is a failure, and wherein the failure of the difference resync instruction is due to an insufficient capacity of storing area to store the second journal entries created after receiving the first instruction and before receiving the difference resync instruction.

3. A computer system according to claim 2, wherein, by executing the asynchronous copy control program, the first host computer instructs the second storage apparatus to copy entire data of the second volume to the third volume to start the third copy pair, if the difference resync instruction is a failure.

4. A host computer comprising:

an interface coupled to a first storage apparatus and a second storage apparatus; and a CPU which executes an application program, a storage clustering control program, and an asynchronous copy control program, which is a separate program from the storage clustering control program, and which sends write data in accordance with the execution of the application program by using the interface, wherein the first storage apparatus is configured to:

provide a first volume for storing the write data, send the write data to a second storage apparatus by executing a synchronous remote copy process for a first copy pair that has the first volume as a copy source and a second volume as a copy destination; and create first journal entries from the write data and sends the first journal entries to a third storage apparatus by executing an asynchronous remote copy process for a second copy pair that has the first volume as a copy source and a third volume as a copy destination, wherein the second storage apparatus provides the second volume, stores the write data to the second volume, and creates second journal entries from the write data sent from the first storage apparatus;

wherein the third storage apparatus provides the third volume, and stores the write data sent as the first journal entries to the third volume, wherein the CPU, by executing the storage clustering control program, detects a failure of writing the write data to the first volume and sends a first instruction to the second storage apparatus, so that the second storage apparatus enables writing the write data to the second volume by changing a pair status of the first copy pair, with continuing to create the second journal entries, and wherein the CPU, by executing the asynchronous copy control program:

asynchronously detects information from the asynchronous copy control program, which information indicates that the failure has occurred and that the first instruction has been sent; and sends a difference resync instruction to the second storage apparatus, so that the second storage apparatus starts a different asynchronous remote copy process for a third copy pair that has the second volume as a copy source and has the third volume as a copy destination, by sending second journal entries created after receiving the first instruction and before receiving the difference resync instruction.

5. A host computer according to claim 4, wherein, by executing the asynchronous copy control program, the CPU displays a message that the difference resync instruction is a failure, and wherein the failure of the difference resync instruction is due to an insufficient capacity of storing area to store the second journal entries created after receiving the first instruction and before receiving the difference resync instruction.

6. A host computer according to claim 5, wherein, by executing the asynchronous copy control program, the CPU instructs the second storage apparatus to copy entire data of the second volume to the third volume to start the third copy pair, if the difference resync instruction is a failure.

7. A non-transitory computer readable memory storing an asynchronous copy control program for a host computer coupled to a first storage apparatus and a second storage apparatus, wherein the host computer is configured to execute an application program, a storage clustering control program, which are separate programs from the asynchronous copy control program, and is configured to send write data in accordance with the execution of the application program, wherein the first storage apparatus is configured to:

provide a first volume for storing the write data, send the write data to a second storage apparatus by executing a synchronous remote copy process for a first copy pair that has the first volume as a copy source and a second volume as a copy destination; and create first journal entries from the write data and sends the first journal entries to a third storage apparatus by executing an asynchronous remote copy process for a second copy pair that has the first volume as a copy source and a third volume as a copy destination, wherein the second storage apparatus provides the second volume, stores the write data to the second volume, and creates second journal entries from the write data sent from the first storage apparatus;

wherein the third storage apparatus provides the third volume and stores the write data sent as the first journal entries to the third volume, wherein the host computer, by executing the storage clustering control program, detects a failure of writing the write data to the first volume and sends a first instruction to the second storage apparatus, so that the second storage apparatus enables writing the write data to the second volume by changing a pair status of the first copy pair and continuing to create the second journal entries; and wherein the asynchronous copy control program causes the host computer to:

asynchronously detect information from the asynchronous copy control program, which information indicates that the failure has occurred and that the first instruction has been sent; and send a difference resync instruction to the second storage apparatus, so that the second storage apparatus starts a different asynchronous remote copy process for a third copy pair that has the second volume as a copy source and has the third volume as a copy destination, by sending second journal entries created after receiving the first instruction and before receiving the difference resync instruction.

8. A host computer according to claim 7, wherein the asynchronous copy control program causes the host computer to display a message that the difference resync instruction is a failure and wherein the failure of the difference resync instruction is due to an insufficient capacity of storing area to store the second journal entries created after receiving the first instruction and before receiving the difference resync instruction.

9. A host computer according to claim 8, wherein the asynchronous copy control program causes the host computer to instruct the second storage apparatus to copy entire data of the second volume to the third volume to start the third copy pair, if the difference resync instruction is a failure.

* * * * *